United States Patent
Hyodo et al.

(10) Patent No.: US 8,655,557 B2
(45) Date of Patent: Feb. 18, 2014

(54) MOTOR CONTROL DEVICE FOR WORKING VEHICLE

(75) Inventors: Koji Hyodo, Kasumigaura (JP); Hiroki Nakazono, Ryugasaki (JP); Masaki Yoshikawa, Kasama (JP); Tadayoshi Aoki, Ryugasaki (JP); Isamu Aoki, Tsukuba (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 44 days.

(21) Appl. No.: 13/378,972

(22) PCT Filed: Jun. 17, 2010

(86) PCT No.: PCT/JP2010/060298
§ 371 (c)(1),
(2), (4) Date: Dec. 16, 2011

(87) PCT Pub. No.: WO2010/147182
PCT Pub. Date: Dec. 23, 2010

(65) Prior Publication Data
US 2012/0095655 A1    Apr. 19, 2012

(30) Foreign Application Priority Data
Jun. 19, 2009   (JP) ................................. 2009-146197

(51) Int. Cl.
*G06F 19/00*     (2011.01)
*G05D 13/00*     (2006.01)
*G06F 7/00*      (2006.01)
*B60W 10/04*     (2006.01)
*B60W 10/10*     (2012.01)

(52) U.S. Cl.
USPC .................. 701/50; 701/54; 701/70; 477/110

(58) Field of Classification Search
None
See application file for complete search history.

(56) References Cited

U.S. PATENT DOCUMENTS 5,389,051 A * 2/1995 Hirate et al. .................. 477/111
5,474,506 A * 12/1995 Palansky et al. ................ 477/63

(Continued)

FOREIGN PATENT DOCUMENTS

JP    2003-328806 A    11/2003
JP    2005-256665 A     9/2005

(Continued)

OTHER PUBLICATIONS

Machine Translation of WO 2009-054499.*

(Continued)

*Primary Examiner* — Fadey Jabr
*Assistant Examiner* — Kevin P Mahne
(74) *Attorney, Agent, or Firm* — Crowell & Moring LLP

(57) ABSTRACT

A working vehicle motor control device includes: a rotational speed control device that controls a motor rotational speed in accordance with an operation amount of an accelerator pedal; a travel drive device that transmits rotation of the motor to wheels through a torque converter and a transmission; a speed ratio detection device that detects a speed ratio of an input shaft and an output shaft of the torque converter; and a speed restriction device that restricts a maximum rotational speed of the motor in accordance with a speed ratio detected by the speed ratio detection device. In the working vehicle motor control device, the speed restriction device restricts the maximum rotational speed when a detected speed ratio is in an acceleration region of the motor rotational speed to less than the maximum rotational speed when a detected speed ratio is in a non-acceleration region.

7 Claims, 20 Drawing Sheets

(56) References Cited

U.S. PATENT DOCUMENTS

| | | | |
|---|---|---|---|
| 5,476,425 A * | 12/1995 | Shiraishi et al. | 477/109 |
| 6,165,102 A * | 12/2000 | Bellinger | 477/54 |
| 7,276,016 B2 * | 10/2007 | Ishii et al. | 477/115 |
| 2004/0214687 A1 * | 10/2004 | Morisawa et al. | 477/109 |
| 2005/0282682 A1 * | 12/2005 | Ishii et al. | 477/107 |
| 2006/0113140 A1 * | 6/2006 | Nakamura et al. | 180/306 |
| 2007/0010927 A1 * | 1/2007 | Rowley et al. | 701/51 |
| 2007/0204605 A1 * | 9/2007 | Itoga et al. | 60/433 |
| 2009/0182475 A1 * | 7/2009 | Kishii | 701/67 |
| 2009/0293841 A1 * | 12/2009 | Nishi et al. | 123/399 |
| 2009/0312925 A1 * | 12/2009 | Oue et al. | 701/58 |
| 2010/0262346 A1 * | 10/2010 | Matsunaga et al. | 701/68 |
| 2010/0262353 A1 * | 10/2010 | Hyodo et al. | 701/102 |
| 2010/0323839 A1 * | 12/2010 | Kawai | 475/210 |
| 2011/0040458 A1 * | 2/2011 | Nakagawa et al. | 701/50 |

FOREIGN PATENT DOCUMENTS

| | | | |
|---|---|---|---|
| JP | 2007-107651 A | | 4/2007 |
| WO | WO 2009-054499 | * | 4/2009 |
| WO | WO 2009/054499 A1 | | 4/2009 |

OTHER PUBLICATIONS

International Search Report dated Sep. 14, 2010 (one (1) page).

* cited by examiner (a)

(b)

(a)

(b)

(a)

(b)

MOTOR CONTROL DEVICE FOR WORKING VEHICLE

TECHNICAL FIELD

The present invention relates to a motor control device for a working vehicle such as a wheel loader.

BACKGROUND ART

There is a known device that restricts an engine rotational speed in a working vehicle such as a wheel loader in which rotation of an engine is input to a transmission through a torque converter (refer to Japanese Laid-Open Patent Publication No. 2007-107651). The device of Japanese Laid-Open Patent Publication No. 2007-107651 reduces the engine rotational speed with an increase in the vehicle speed so as not to exceed an upper limit vehicle speed corresponding to the second speed when the maximum speed step is set to the second speed for example.

Japanese Laid-Open Patent Publication No. 2007-107651

SUMMARY OF INVENTION

Technical Problem

However, reducing an engine rotational speed according to the vehicle speed as in the device described in Japanese Laid-Open Patent Publication No. 2007-107651 will not give sufficient travel driving force and thus mobility and workability may be reduced.

Solution to Problem

A motor control device for a working vehicle according to a first aspect of the present invention, comprises: a rotational speed control device that controls a rotational speed of a motor in accordance with an operation amount of an accelerator pedal; a travel drive device that transmits rotation of the motor to wheels through a torque converter and a transmission; a speed ratio detection device that detects a speed ratio of an input shaft and an output shaft of the torque converter; and a speed restriction device that restricts a maximum rotational speed of the motor in accordance with a speed ratio detected by the speed ratio detection device, wherein: the speed restriction device restricts the maximum rotational speed when a detected speed ratio is in an acceleration region of the rotational speed of the motor to less than the maximum rotational speed when a detected speed ratio is in a non-acceleration region.

According to a second aspect of the present invention, in the motor control device for a working vehicle according to the first aspect, it is preferable that when a detected speed ratio becomes equal to or greater than a first predetermined value, the speed restriction device sets a restriction amount of the maximum rotational speed greater than that when a speed ratio is less than the first predetermined value.

According to a third aspect of the present invention, in the motor control device for a working vehicle according to the first aspect, it is preferable that the speed restriction device reduces a value of the maximum rotational speed when a detected speed ratio is equal to or greater than a first predetermined value and does not reduce a value of the maximum rotational speed when a speed ratio is less than the first predetermined value.

According to a fourth aspect of the present invention, in the motor control device for a working vehicle according to the second or third aspect, it is preferable that in a case where a speed step of the transmission is a low speed step of a first speed step or a second speed step, when a detected speed ratio is equal to or greater than the first predetermined value and less than a second predetermined value, which is greater than the first predetermined value, the speed restriction device, sets the restriction amount to be greater than that when a speed ratio is less than the first predetermined value and equal to or greater than the second predetermined value.

According to a fifth aspect of the present invention, in the motor control device for a working vehicle according to the second to fourth aspects, it is preferable that the speed restriction device, after increasing the restriction amount, reduces the restriction amount as time passes.

According to a sixth aspect of the present invention, in the motor control device for a working vehicle according to the second to fifth aspects, it is preferable that in a case where a speed step of the transmission is a high speed step of equal to or greater than a third speed step, when a detected speed ratio is equal to or greater than the first predetermined value, the speed restriction device gradually increases the restriction amount with an increase in a speed ratio so that a maximum vehicle speed of a vehicle becomes a vehicle speed limit that is set in advance.

According to a seventh aspect of the present invention, the motor control device for a working vehicle according to the sixth aspect may further comprise a vehicle speed detection device that detects a vehicle speed, wherein: when a vehicle speed detected by the vehicle speed detection device is equal to or greater than a set vehicle speed that is lower than the vehicle speed limit, the speed restriction device gradually increases the restriction amount, and, when a vehicle speed is less than the set vehicle speed, the speed restriction device does not restrict the maximum rotational speed.

According to an eighth aspect of the present invention, the motor control device for a working vehicle according to the sixth or seventh aspect may further comprise a determination device that makes a decision as to whether a value detected by the speed ratio detection device is normal or abnormal, wherein: when the determination device makes a decision that the detection value is normal, the speed restriction device gradually reduces the maximum rotational speed to a predetermined value with an increase in a speed ratio, and, when the determination device makes a decision that the detection value is abnormal, the speed restriction device restricts the maximum rotational speed to the predetermined value regardless of a speed ratio.

Advantageous Effect of the Invention

According to the present invention, the motor maximum rotational speed is made lower, when the torque converter speed ratio is in an acceleration region of the motor rotational speed, than a value in a non-acceleration region of the motor rotational speed, thereby providing a sufficient travel driving force while restricting the engine rotational speed.

BRIEF DESCRIPTION OF THE DRAWINGS

FIG. 10 is a diagram showing an example of travel driving force characteristics at the time of speed restriction on.

DESCRIPTION OF EMBODIMENTS

First Embodiment

A device for controlling a motor, engine or prime mover of a working vehicle according to a first embodiment of the present invention will now be explained with reference to FIG. 1 to FIG. 14.

Figure 1:
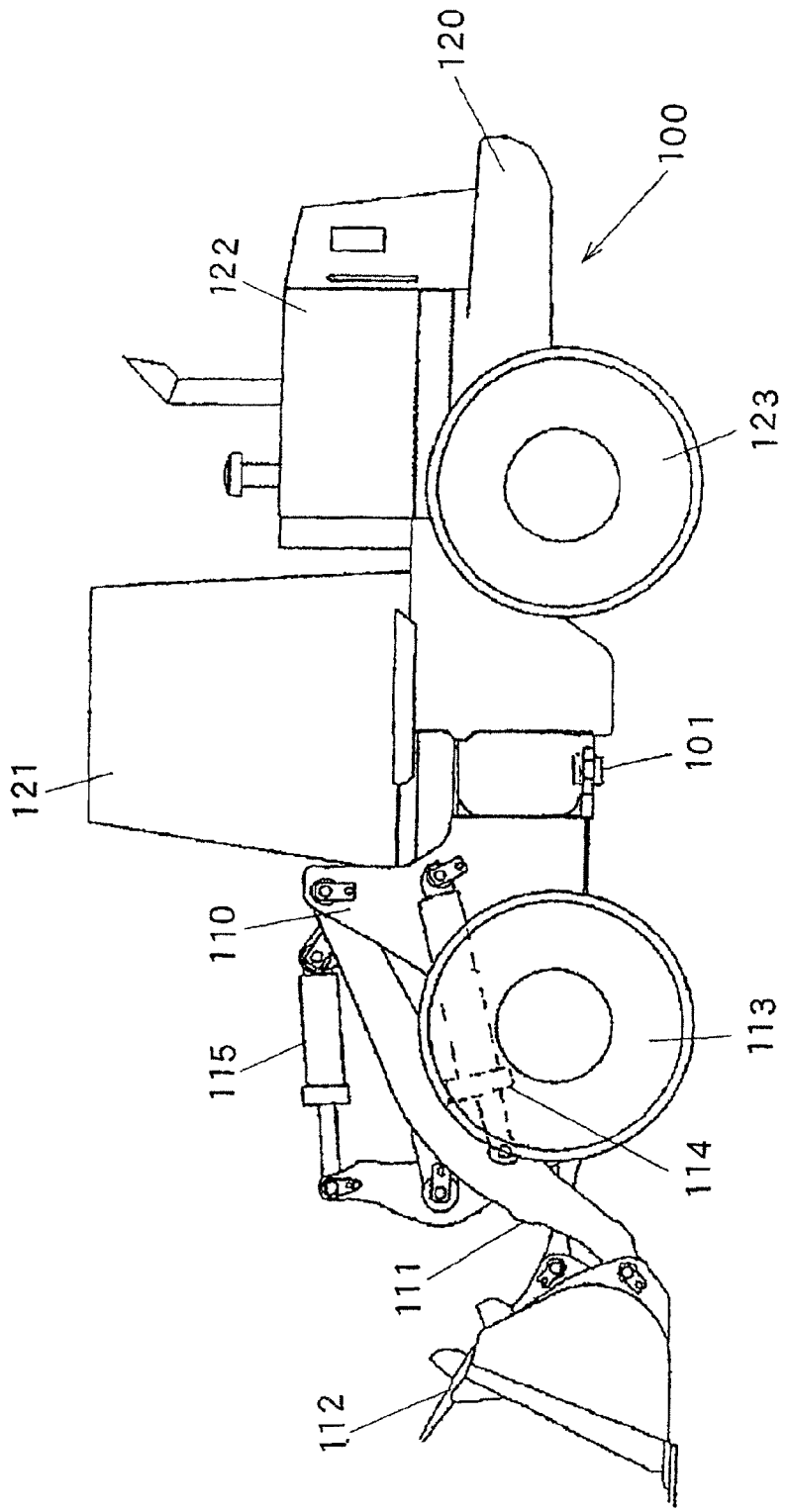
FIG. 1 is a side view of a wheel loader according to an embodiment of the present invention.

FIG. 1 is a side view of a wheel loader that is an example of a working vehicle to which the motor control device according to the present embodiment is applied. A wheel loader 100 is constituted with a front body 110 including an arm 111, a bucket 112, tires 113, and the like and a rear body 120 including a driver cabin 121, an engine bay 122, tires 123, and the like. The arm 111 vertically rotates (articulates up and down) on drive of an arm cylinder 114 and the bucket 112 vertically rotates (dumps or crowds) on drive of a bucket cylinder 115. The front body 110 and the rear body 120 are rotatably connected with each other through a center pin 101, so that the front body 110 swings side to side with respect to the rear body 120 by expansion and contraction of a steering cylinder (not shown in the figures).

Figure 2:
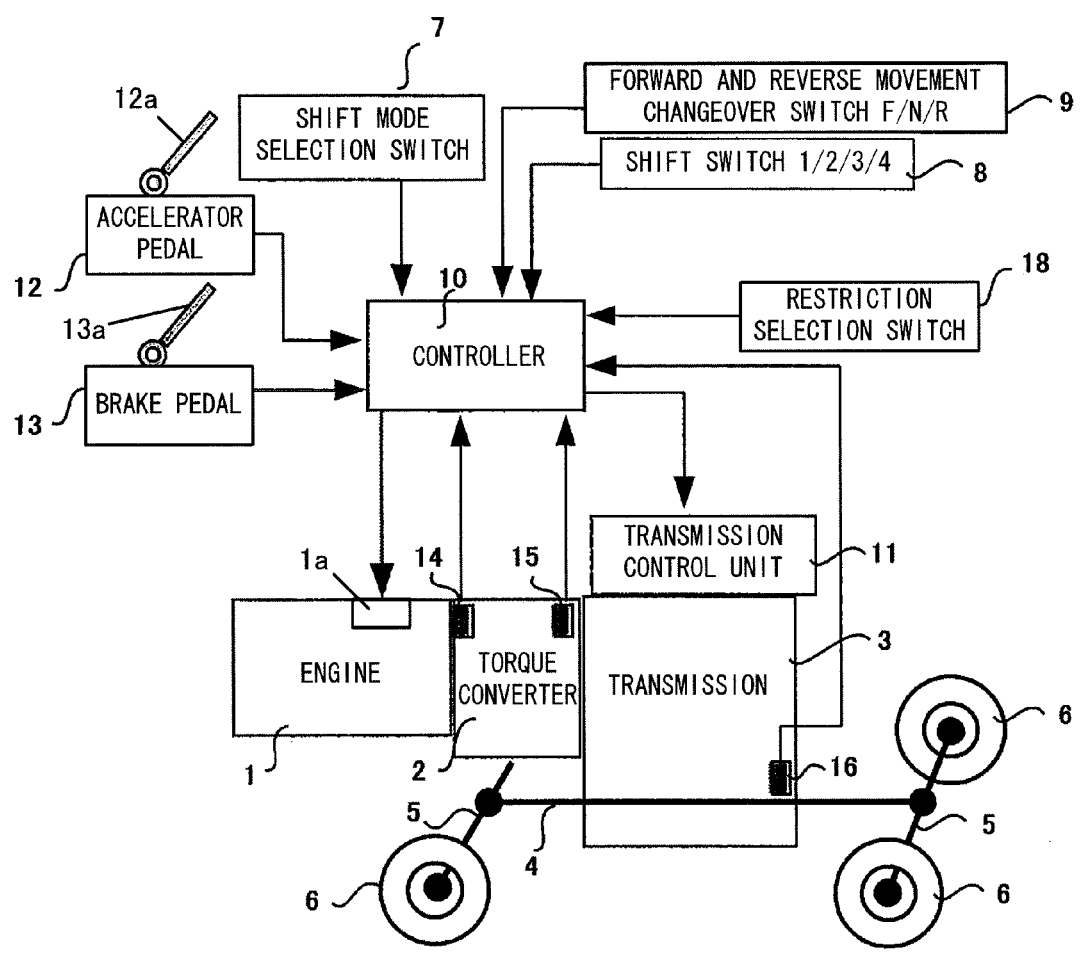
FIG. 2 is a diagram showing an outline structure of a motor control device according to an embodiment of the present invention.

FIG. 2 is a diagram showing an outline structure of the motor control device according to the present embodiment. An input shaft of a torque converter 2 is connected to an output shaft of an engine 1, and an output shaft of the torque converter 2 is connected to a transmission 3 that can shift the speed step from the first speed to the fourth speed. The torque converter 2 is a fluid clutch constituted with a well known impeller, a turbine, and a stator, and rotation of the engine 1 is transmitted to the transmission 3 through the torque converter 2. The transmission 3 includes a hydraulic clutch that shifts the speed step, and rotation of the output shaft of the torque converter 2 is shifted at the transmission 3. The shifted rotation is transmitted to tires 6 (113 and 123 of FIG. 1) through a propeller shaft 4 and axles 5 and thus the vehicle travels.

It is to be noted that although not illustrated, the wheel loader 100 is provided with a working hydraulic pump to be driven by the engine 1, and pressure oil is supplied from the hydraulic pump to actuators such as the arm cylinder 114 and the bucket cylinder 115, thereby performing a work.

A controller 10 includes an arithmetic processing unit having a CPU, a ROM, a RAM, other peripheral circuits, and the like. The controller 10 is connected with an accelerator operation amount detector 12 that detects an operation amount of an accelerator pedal 12a, a brake operation amount detector 13 that detects an operation amount of a brake pedal 13a, a rotational speed detector 14 that detects a rotational speed Ni of the input shaft of the torque converter 2, a rotational speed detector 15 that detects a rotational speed Nt of the output shaft of the torque converter 2, a vehicle speed detector 16 that detects the rotational speed of the output shaft of the transmission 3, i.e., a vehicle speed v, a shift mode selection switch 7 that selects between manual shift mode and automatic shift mode, a shift switch 8 that instructs an upper limit of the speed step between the first speed and the fourth speed, a forward and reverse movement changeover switch 9 that instructs forward and reverse movements of the vehicle, and a restriction selection switch 18 that selects restriction/no-restriction of the engine rotational speed.

The torque converter 2 has a function to increase output torque over input torque, i.e., a function to make torque ratio 1 or greater. A torque ratio is reduced with an increase in a torque converter speed ratio e (output rotational speed Nt/input rotational speed Ni), which is a ratio of the rotational speeds of the input shaft and the output shaft of the torque converter 2. For instance, when travel load is increased during traveling in a state where the engine rotational speed is constant, the rotational speed Nt of the torque converter 2, i.e., the vehicle speed is reduced and the torque converter speed ratio e is reduced. At this time, the torque ratio is increased, thereby allowing the vehicle to travel on a greater driving force (traction force). In other words, the lower the vehicle speed is, the greater the driving force is (low speed high torque) and the higher the vehicle speed is, the less the driving force is (high speed low torque).

The transmission 3 is an automatic transmission that has a solenoid valve corresponding to each speed step of the first speed to the fourth speed. Those solenoid valves are driven by a control signal that is output from the controller 10 to a transmission control unit 11 and thus the speed is shifted.

Figure 3:
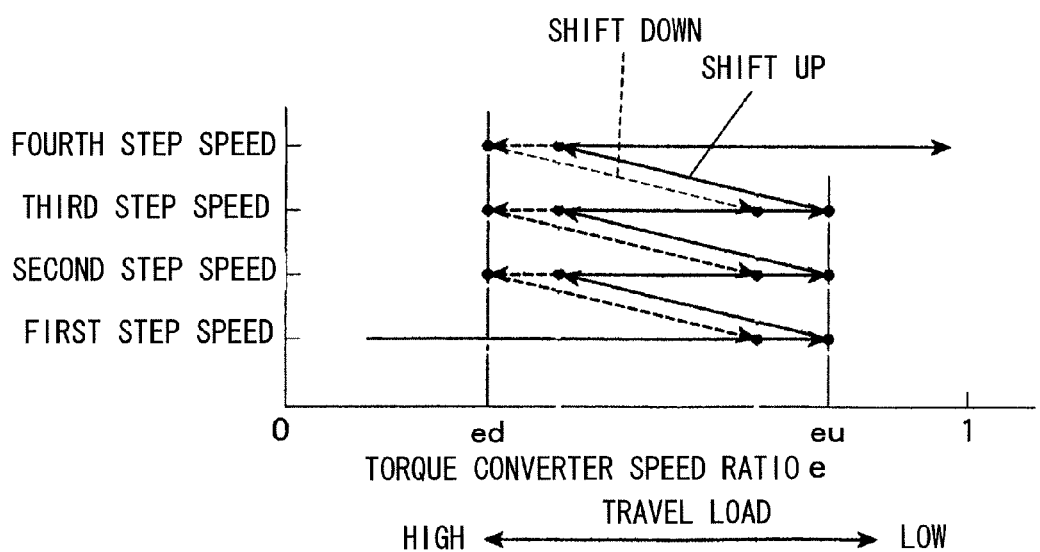
FIG. 3 (a) is a diagram showing timing of automatic speed change through torque converter speed ratio reference control and FIG. 3 (b) is a diagram showing timing of automatic speed change through vehicle speed reference control.
Figure 3:
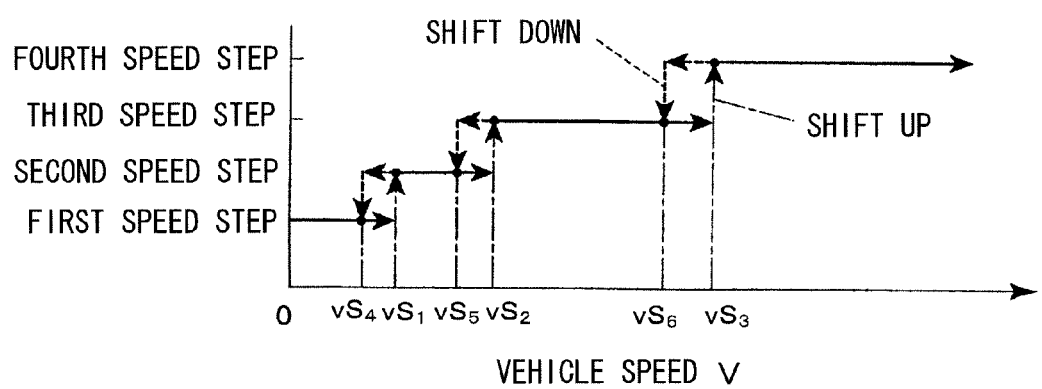

FIGS. 3 (a) and (b) are diagrams showing timing of automatic speed change by the transmission 3. There are two types of automatic speed change control, i.e., torque converter speed ratio reference control by which the speed is shifted when the torque converter speed ratio e reaches a predetermined value as shown in FIG. 3 (a) and vehicle speed reference control by which the speed is shifted when the vehicle speed v reaches a predetermined value as shown in FIG. 3 (b). In the present embodiment, the speed step of the transmission 3 is controlled by the torque converter speed ratio reference control.

With the torque converter speed ratio reference control shown in FIG. 3 (a), when travel load is reduced and the torque converter speed ratio e is increased and thus the torque converter speed ratio e becomes equal to or greater than a predetermined value eu, the speed step is shifted up by one step. On the other hand, when travel load is increased and the torque converter speed ratio e is reduced and thus the torque converter speed ratio e becomes equal to or less than a predetermined value ed, the speed step is shifted down by one step. This causes the speed step of the transmission 3 to be automatically changed between the first speed and the fourth speed in accordance with the torque converter speed ratio e. At this time, the speed is automatically shifted with a speed step selected by the shift switch 8 as an upper limit. For example, if the second speed is selected by the shift switch 8, the speed step is set to either the first speed or the second speed. If the first speed is selected, the speed step is fixed to the first speed.

It is to be noted that the speed step of the transmission 3 may be controlled by the vehicle speed reference control in place of the torque converter speed ratio reference control. In this case, as shown in FIG. 3 (b), when the vehicle speed v is increased to reach predetermined values vS1, vS2, and vS3, the speed step is shifted up by one step, and when the vehicle speed v is reduced to reach predetermined values vS4, vS5, and vS6, the speed step is shifted down by one step.

Figure 4:
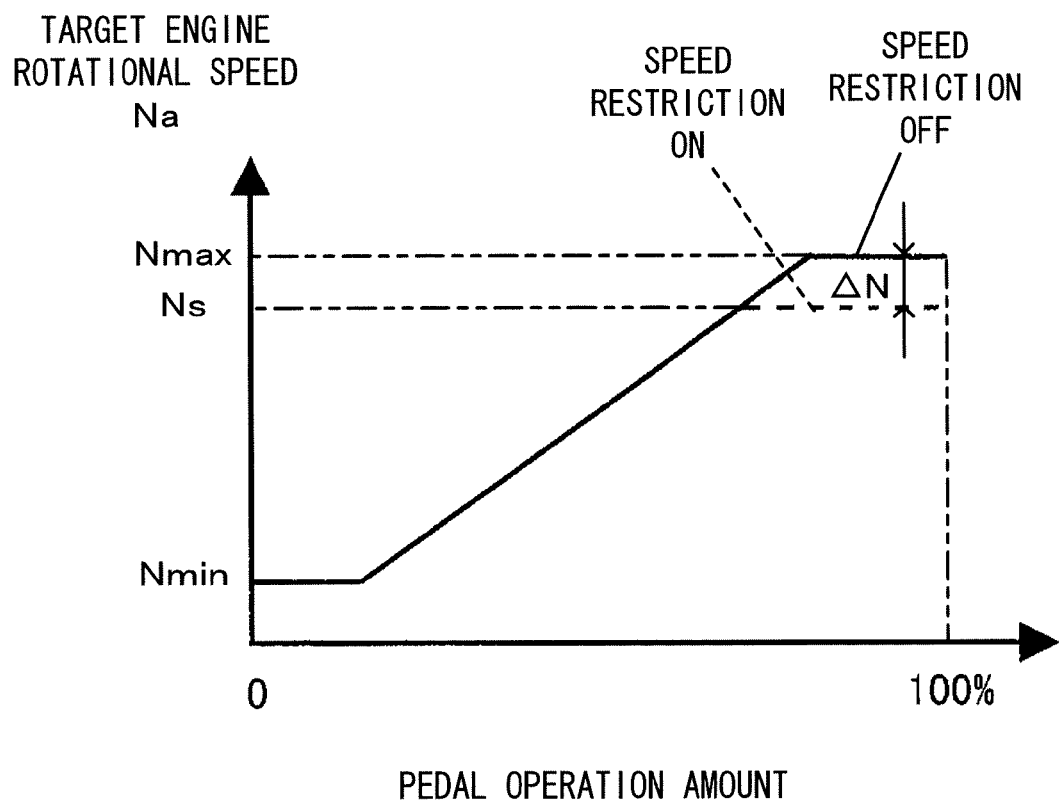
FIG. 4 is a diagram showing a relationship between a pedal operation amount and a target engine rotational speed.

The controller 10 controls the engine rotational speed to be a target engine rotational speed Na in accordance with an operation amount of the accelerator pedal 12a. FIG. 4 is a diagram showing a relationship between a pedal operation amount and the target engine rotational speed Na. In the figure, the solid line represents a characteristic of no-restriction of the engine rotational speed, i.e., speed restriction OFF, and the dotted line represents a characteristic of restriction of the engine rotational speed, i.e., speed restriction ON. The target engine rotational speed Na can be changed between the upper limit value Nmax and the lower limit value Nmin of the engine rotational speed.

As shown in FIG. 4, when the accelerator pedal 12a is not operated, the target engine rotational speed Na is at the lower limit value Nmin, and the target engine rotational speed Na increases with an increase in the pedal operation amount. In a state of speed restriction OFF, the target engine rotational speed Na with the pedal fully depressed becomes the upper limit value Nmax. In a state of speed restriction ON, on the other hand, the maximum value of the target engine rotational speed Na, i.e., an engine maximum rotational speed Namax, is restricted, and thus the target engine rotational speed Na with the pedal fully depressed becomes a predetermined value Ns (<Nmax). The controller 10 outputs a control signal corresponding to the target engine rotational speed Na to an engine control unit 1a, and controls the engine rotational speed to be the target engine rotational speed Na. In the present embodiment, a rotational speed restriction amount $\Delta N$, which is a difference between the upper limit value Nmax of the target engine rotational speed Na and the engine maximum rotational speed Ns at the time of speed restriction ON, is set to a value in accordance with the torque converter speed ratio e as described below.

Figure 5:
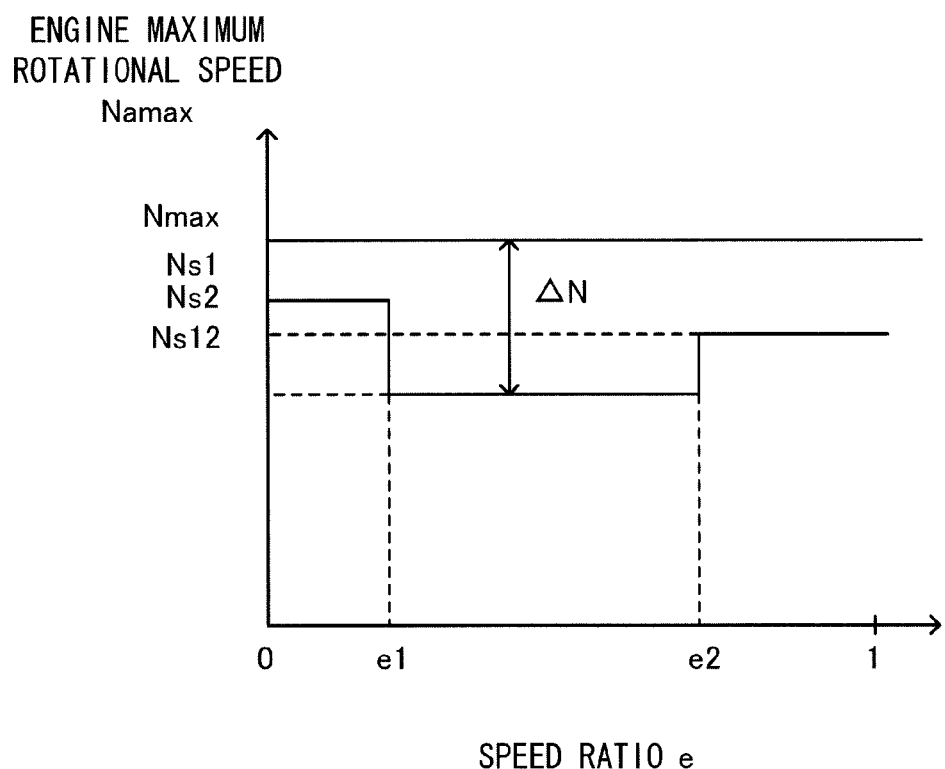
FIG. 5 is a diagram showing a relationship between a speed ratio and an engine maximum rotational speed in the motor control device according to a first embodiment.

FIG. 5 is a diagram showing a relationship between the torque converter speed ratio e and the engine maximum rotational speed Namax at the time of speed restriction ON. In a low speed ratio region where the speed ratio e is less than a predetermined value e1, the engine maximum rotational speed is set to the predetermined value Ns1. In a medium speed ratio region where the speed ratio e is equal to or greater than the predetermined value e1 and less than a predetermined value e2, the engine maximum rotational speed is set to the predetermined value Ns12. In a high speed ratio region where the speed ratio e is equal to or greater than the predetermined value e2, the engine maximum rotational speed is set to a predetermined value Ns2. Here, the low speed ratio region is a speed ratio region mainly immediately after starting moving or during excavation work, the medium speed ratio region is a speed ratio region mainly in a state of acceleration, and the high speed ratio region is a speed ratio region mainly in a steady traveling state, and e1 and e2 are set to, for example, 0.25 and 0.75, respectively. It is to be noted that there is a relationship of, for instance, e1<ed and e2<eu, between the predetermined values e1 and e2 and the predetermined values ed and eu of FIG. 3 (a).

Figure 6:
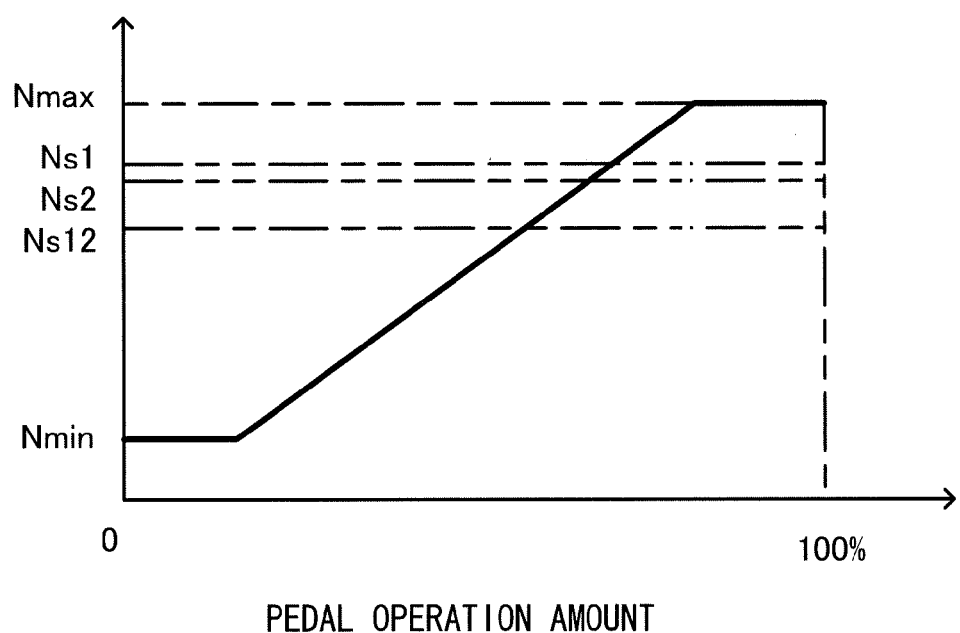
FIG. 6 is a diagram showing a relationship between a pedal operation amount and a target engine rotational speed in the motor control device according to the first embodiment.

In FIG. 5, there is a relationship of Nmax>Ns1>Ns2>Ns12 between the upper limit value Nmax and the limit values Ns1, Ns12, and Ns2 of engine maximum rotational speed, and the rotational speed restriction amount $\Delta N$ is maximized in the medium speed ratio region. It is to be noted that when the engine maximum rotational speed is restricted, the maximum driving force and the maximum vehicle speed of the vehicle are reduced accordingly but on the other hand in the present embodiment, each of the limit values Ns1, Ns12, and Ns2 is set to a value in which those reduction do not become a practical problem. With respect to the upper limit value Nmax (100%) of the engine rotational speed, for example, Ns1 is set to 90%, Ns12 is set to 75%, and Ns2 is set to 85%. In this case, a relationship between a pedal operation amount and the target engine rotational speed Na is as shown in FIG. 6.

Figure 7:
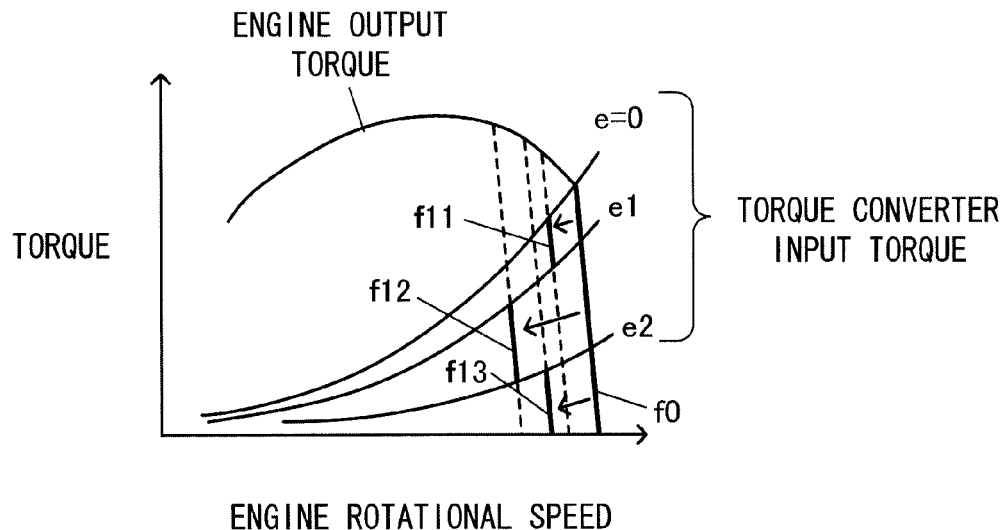
FIG. 7 (a) is a diagram showing torque characteristics in the motor control device according to the first embodiment and FIG. 7 (b) is a diagram showing a comparison example thereof.
Figure 7:
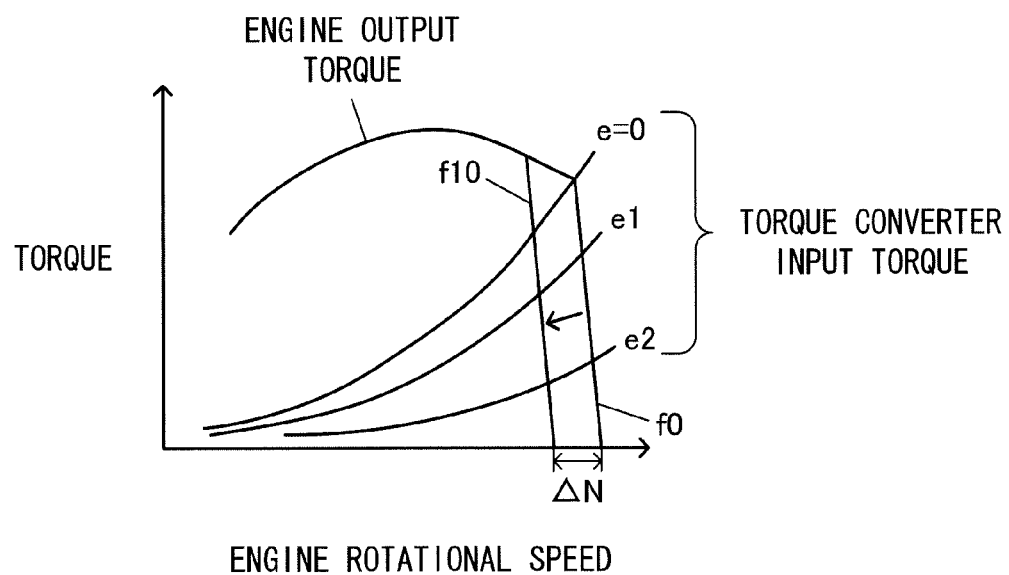

FIGS. 7 (a) and (b) are torque diagrams each showing a relationship between the engine rotational speed and the torque when the accelerator pedal 12a is fully depressed. It is to be noted that FIG. 7 (a) is a torque diagram when the engine maximum rotational speed is restricted in accordance with the torque converter speed ratio e and FIG. 7 (b) is a torque diagram when the engine maximum rotational speed is uniformly restricted by a predetermined amount $\Delta N$ regardless of the torque converter speed ratio e. In the figures, a characteristic f0 is an engine output torque characteristic when the engine maximum rotational speed is not restricted and characteristics f10 to f13 are each an engine output torque characteristic when the engine maximum rotational speed is restricted.

Torque converter input torque increases in proportion to the square of the rotational speed Ni of the torque converter input shaft, where the greater the torque converter speed ratio e is, the less the torque converter input torque becomes. Intersections of the engine output torque characteristics and the torque converter input torque characteristics are matching points, and, when the vehicle is traveling, the engine output torque and the torque converter input torque are at the values of the matching point. In FIG. 7 (b), when the engine rotational speed is restricted by the predetermined amount $\Delta N$, the matching points are shifted to the left of the figure and the torque converter input torque becomes less than that when the engine rotational speed is not restricted. The torque converter input torque×the rotational speed of the torque converter input shaft is equal to an input power to the torque converter 2 and corresponds to an engine output, and hence the engine maximum rotational speed is restricted so as to reduce the engine output, thereby improving fuel economy.

However, a uniform restriction on the engine maximum rotational speed as in FIG. 7 (b) will reduce the overall torque converter input torque, thereby also reducing the power (horsepower) that is available for traveling. For this reason, travel driving force when working becomes insufficient, causing a practical problem. In the present embodiment, on the other hand, since the engine rotational speed is restricted in accordance with the torque converter speed ratio e, as shown in FIG. 7 (a), reduction in the travel driving force becomes little in the range where the torque converter speed ratio e is less than the predetermined value e1 and reduction in the travel driving force becomes great in the range where the torque converter speed ratio e is equal to or greater than the predetermined value e1 and less than the predetermined value e2. This improves fuel economy and gives a sufficient excavating power when working.

Figure 8:
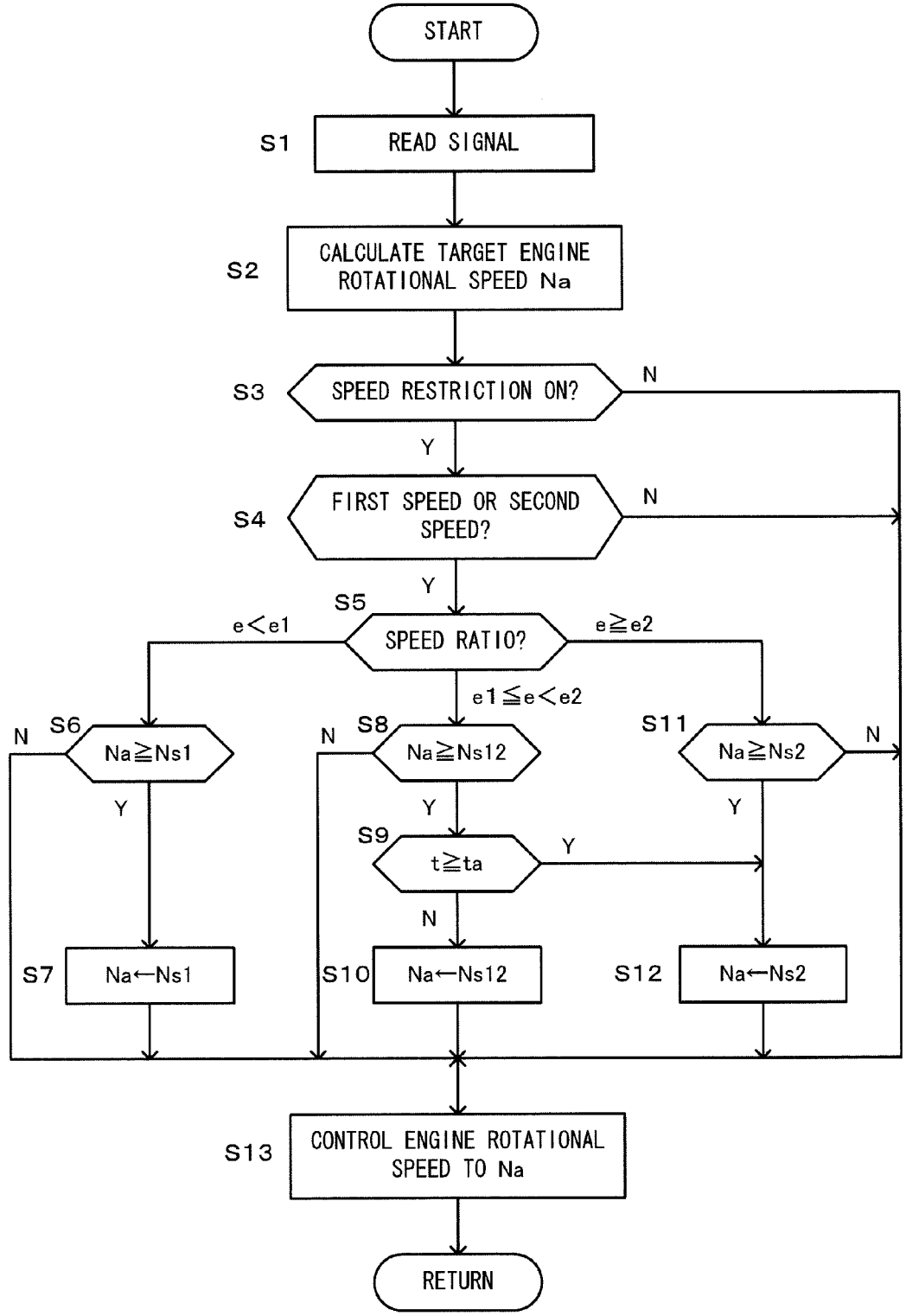
FIG. 8 is a flowchart showing an example of processing in a controller for motor control according to the first embodiment.

FIG. 8 is a flowchart showing an example of processing to be executed by the CPU of the controller 10, in particular, an example of processing related to engine rotational speed control. The processing shown in this flowchart is initiated by, for instance, turning an engine key switch on. In a step S1, signals from the variety of sensors 12 to 16 and the switches 7 to 9 and 18 of FIG. 2 are read. In a step S2, the target engine rotational speed Na with respect to a pedal operation amount detected by the accelerator operation amount detector 12 is calculated based upon the pre-stored characteristic of no-restriction of the engine maximum rotational speed indicated by the solid line in FIG. 6.

In a step S3, a decision is made as to whether or not the engine rotational speed restriction has been selected by the restriction selection switch 18, i.e., whether or not the speed restriction ON has been selected. If a positive decision is made in the step S3, the flow of control proceeds to a step S4, and if a negative decision is made therein, the flow of control proceeds to the step S13. In the step S4, a decision is made as to whether or not the speed step of the transmission 3 is equal to or less than the second speed. If a positive decision is made in the step S4, the flow of control proceeds to a step S5, and if a negative decision is made therein, the flow of control proceeds to the step S13. In the step S5, the torque converter speed ratio e is calculated by signals from the rotational speed detectors 14 and 15 and a decision is made as to which speed ratio region the torque converter speed ratio e falls into, the low speed ratio region (e<e1), the medium speed ratio region (e1≤e<e2), or the high speed ratio region (e≥e2).

If a decision is made in the step S5 that the torque converter speed ratio e is in the low speed ratio region, the flow of control proceeds to a step S6, where a decision is made as to whether or not the target engine rotational speed Na calculated in the step S2 is equal to or greater than the predetermined limit value Ns1 of FIG. 5. If a positive decision is made in the step S6, the flow of control proceeds to a step S7, and if a negative decision is made therein, the flow of control proceeds to the step S13. In the step S7, the target engine rotational speed Na is set to Ns1, and then the flow of control proceeds to the step S13. In the step S13, a control signal is output to the engine control unit 1a, and the engine rotational speed is controlled to be the target engine rotational speed Na.

If a decision is made in the step S5 that the torque converter speed ratio e is in the high speed ratio region, the flow of control proceeds to a step S11, where a decision is made as to whether or not the target engine rotational speed Na calculated in the step S2 is equal to or greater than the predetermined limit value Ns2 of FIG. 5. If a positive decision is made in the step S11, the flow of control proceeds to a step S12, and if a negative decision is made therein, the flow of control proceeds to the step S13. In the step S12, the target engine rotational speed Na is set to Ns2, and then the flow of control proceeds to the step S13.

If a decision is made in the step S5 that the torque converter speed ratio e is in the medium speed ratio region, the flow of control proceeds to a step S8, where a decision is made as to whether or not the target engine rotational speed Na calculated in the step S2 is equal to or greater than the predetermined limit value Ns12 of FIG. 5. If a positive decision is made in the step S8, the flow of control proceeds to a step S9, and if a negative decision is made therein, the flow of control proceeds to the step S13. In the step S9, a period of time is counted by a timer and a decision is made as to whether or not a period of time t counted by the timer has been equal to or greater than a predetermined period of time ta. The predetermined period of time ta is set to a period of time (e.g., approximately 1.5 seconds) in which the operator does not perceive reduction in the vehicle speed due to an increase in the rotational speed restriction amount ΔN.

If a positive decision is made in the step S9, the flow of control proceeds to the step S12, and if a negative decision is made therein, the flow of control proceeds to a step S10. It is to be noted that the timer is reset when a negative decision is made in the step S3, when a negative decision is made in the step S4, when a decision is made in the step S5 that the speed ratio e is in a speed ratio region other than the medium speed ratio region, or when a positive decision is made in the step S9. In the step S10, the target engine rotational speed Na is set to Ns12, and then the flow of control proceeds to the step S13.

Figure 9:
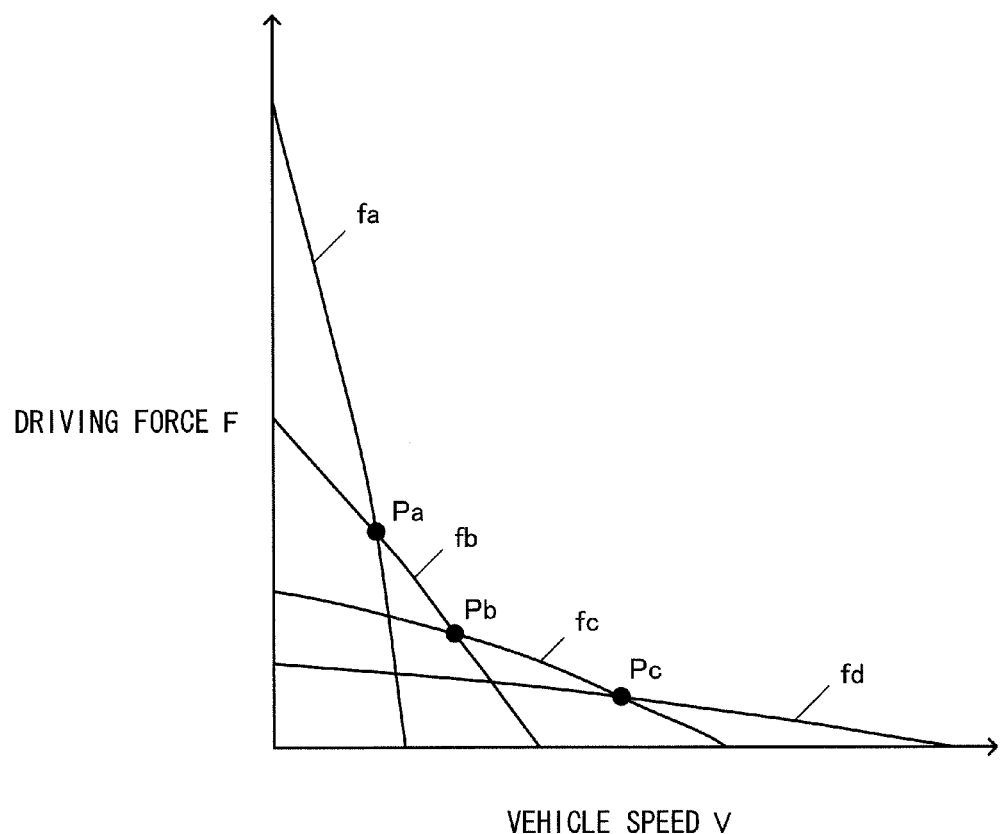
FIG. 9 is a diagram showing travel driving force characteristics at the time of speed restriction off.

The operations of the first embodiment are summarized as follows. When the restriction selection switch 18 selects the speed restriction OFF and when, even through the speed restriction ON is selected, the speed step is in equal to or greater than the third speed, the maximum rotational speed of the engine 1 is not restricted and the engine rotational speed when the pedal is fully depressed is controlled to be the upper limit value Nmax (the step S3 to the step S13, the step S4 to the step S13). In this case, a relationship between the vehicle speed v and a travel driving force F is as shown in FIG. 9. In the figure, fa to fd represent characteristics of the first speed step to the fourth speed step, respectively, and, in each of the speed steps, the driving force F decreases with an increase in the vehicle speed v. Intersections of the characteristics fa and fb, fb and fc, and fc and fd are shift points pa to pc, respectively, and the speed ratio at each of the shift points pa to pc corresponds to either ed or eu.

Figure 10:
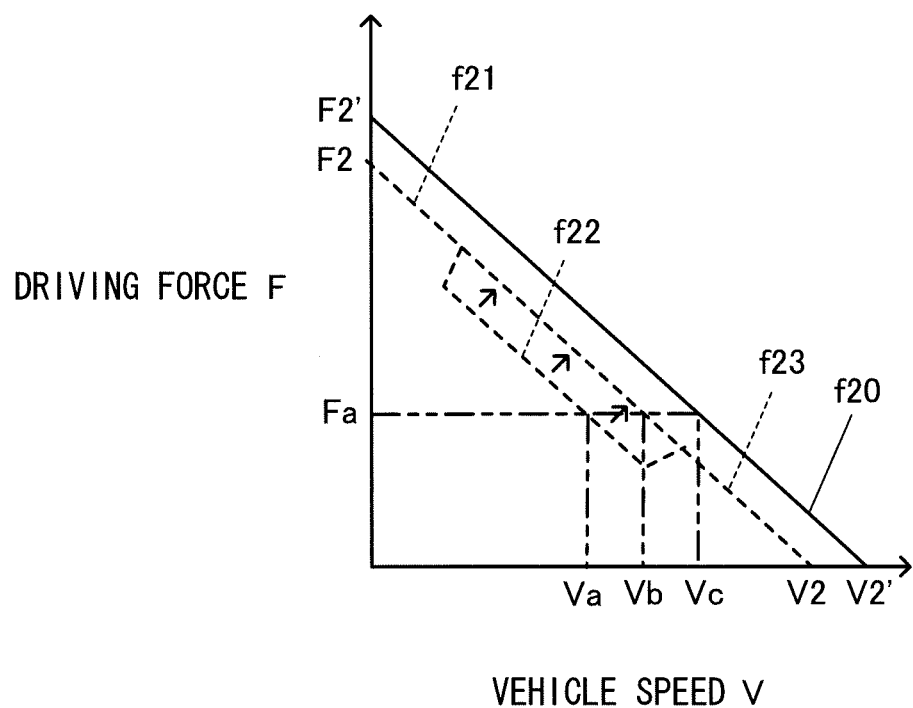

On the other hand, when the restriction selection switch 18 selects the speed restriction ON, the engine maximum rotational speed is restricted in accordance with the speed ratio e, and the engine rotational speed when the pedal is fully depressed becomes any one of the predetermined values Ns1, Ns12, and Ns2 (the step S7, the step S10, and the step S12). In this case, a relationship between the vehicle speed v and the travel driving force F in the second speed step is as shown in FIG. 10. In the figure, f20 represents a characteristic at the time of speed restriction OFF (corresponding to the characteristic fb of FIG. 9) and characteristics f21 to f23 are characteristics at the time of speed restriction ON in the low speed ratio region, the medium speed ratio region, and the high speed ratio region, respectively.

In FIG. 10, a maximum vehicle speed v2 at the time of speed restriction ON is lower than a maximum vehicle speed v2' at the time of speed restriction OFF, and a maximum driving force F2 at the time of speed restriction ON is less than a maximum driving force F2' at the time of speed restriction OFF. In addition, by comparing at the same vehicle speed, the driving force at the time of speed restriction ON is less than the driving force at the time of speed restriction OFF, in particular, the driving force (the characteristic f22) in the medium speed ratio region is reduced more greatly than the driving forces (the characteristics f21 and f23) in the low speed ratio region and the high speed ratio region are. This allows fuel economy to be significantly improved without reducing so much the maximum driving force and the maximum vehicle speed at the time of speed restriction ON.

If the speed ratio e is in the medium speed region at the time of speed restriction ON, the rotational speed restriction amount ΔN is reduced after the predetermined period of time ta (the step S9 to the step S12) and the characteristic f22 of the driving force is shifted to the right as indicated by the arrows in the figure. For this reason, the vehicle speed is increased from va to vb after the predetermined period of time ta, for instance, in uphill traveling on a driving force Fa, thereby preventing practical running performance from being reduced without causing the operator to perceive so much a significant reduction in the vehicle speed at the time of speed restriction ON.

Figure 11:
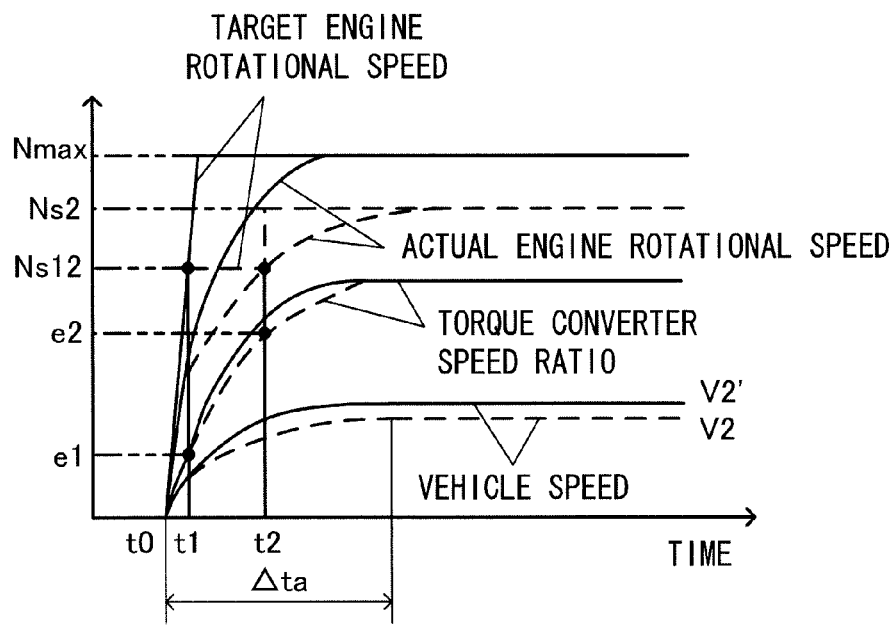
FIG. 11 (a) is a diagram showing an example of operating characteristics of the motor control device according to the first embodiment and FIG. 11 (b) is a diagram showing a comparison example thereof.
Figure 11:
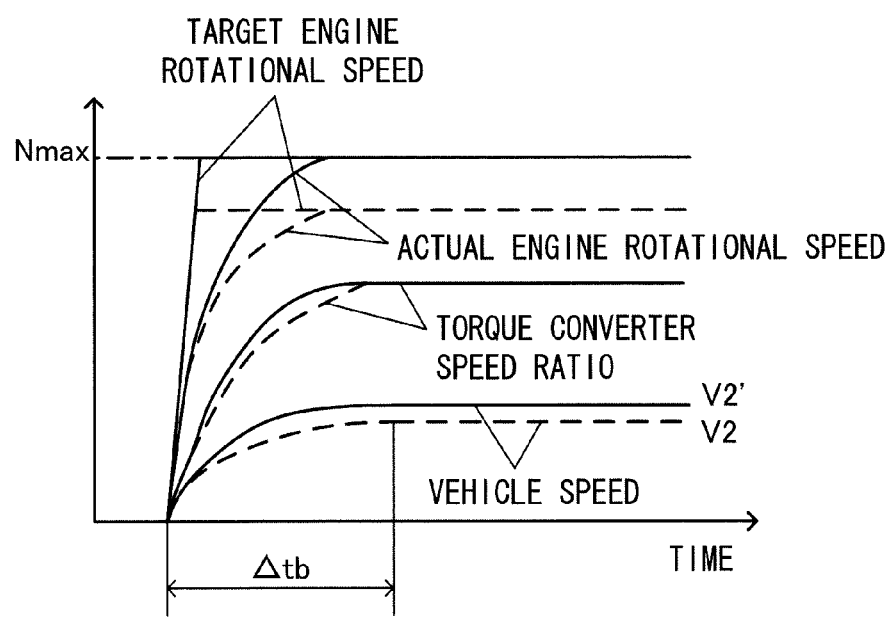

FIG. 11 (a) is a diagram showing time change in the target engine rotational speed Na, an actual engine rotational speed, the torque converter speed ratio e, and the vehicle speed v at the time of acceleration to start moving in flat traveling. In the figure, the solid lines each represent a characteristic at the time of speed restriction OFF and the dotted lines each represent a characteristic at the time of speed restriction ON. It is to be noted that FIG. 11 (b), showing characteristics when the engine maximum rotational speed is uniformly restricted, is a comparison example for the present embodiment.

As shown in FIG. 11 (a), if the accelerator pedal 12a is fully depressed at a time point t0 in a state of speed restriction OFF, the target engine rotational speed rises sharply to the upper limit value Nmax, the actual engine rotational speed follows behind that. Due to this, the vehicle speed rises up to the maximum vehicle speed v2' and the torque converter speed ratio e also rises with the rise of the vehicle speed. On the other hand, in a state of speed restriction ON, the torque converter speed ratio e falls into the medium speed ratio region (e1≤e<e2) between time points t1 to t2, and in this range the target engine rotational speed is restricted to Ns12. This slows down the degree of rise of the actual engine rotational speed, thereby improving fuel economy. In this case, it takes a period of time Δta for the vehicle speed to become the maximum vehicle speed v2.

In FIG. 11 (b), on the other hand, the actual engine rotational speed rises sharply, thereby having little effect on improvement in fuel economy. In this case, it takes a period of time Δtb (<Δta) for the vehicle speed to become the maximum vehicle speed v2. Although it takes a shorter period of time for the vehicle speed to become the maximum vehicle speed in FIG. 11 (b), the difference between Δtb and Δta is so small (e.g., equal to or less than 1 second) that there is no practical problem.

Figure 12:
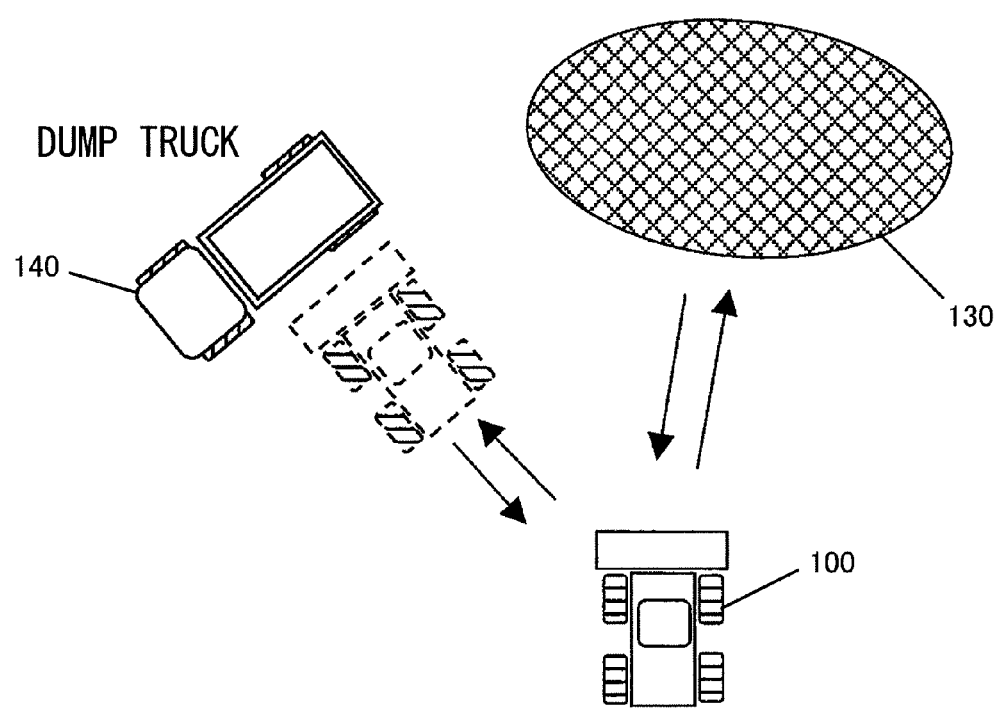
FIG. 12 is an illustration showing an example of loading work in a V-cycle.

An excavation work by a wheel loader will be explained. FIG. 12 illustrates a loading work in so-called V-cycle in which an operator puts a vehicle 100 into a mound 130 of sand, gravel, and dirt and the like, takes the sand and the like into the bucket, moves the vehicle 100 reverse, changes its direction, moves the vehicle 100 towards a dump truck 140, and then loads the sand and the like in the bucket into the dump truck 140. In this case, since the excavation work shown in FIG. 13 (a) requires the great travel driving force F, the accelerator pedal 12a is fully depressed with the transmission 3 set in the first speed step.

Figure 13:
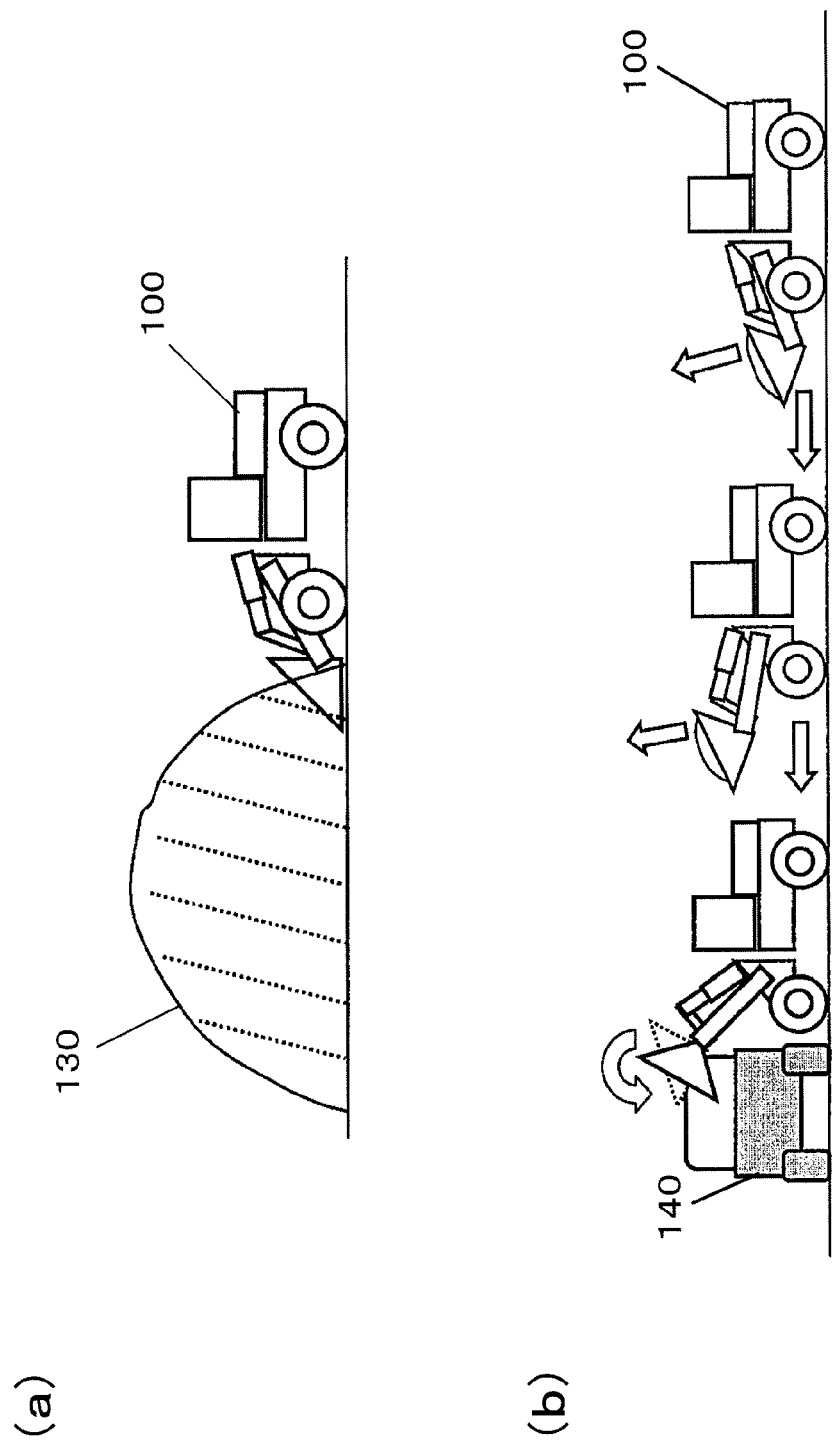
FIG. 13 (a) is an illustration showing an excavation operation and FIG. 13 (b) is an illustration showing a loading operation into a dump.

At the time of loading work to the dump truck 140 shown in FIG. 13 (b), the bucket 112 is lifted up with the accelerator pedal 12a fully depressed in a state of the second speed, at the same time the vehicle 100 is moved towards the dump truck 140 and the sand and the like is discharged. At the time of loading to the dump truck 140 in the second speed, work cycle time is prolonged due to significant reduction in the engine maximum rotational speed, however, fuel consumption can be reduced, thereby increasing an amount of work (fuel economy to amount of work) obtained while consuming fuel of 1L as a result.

The following operations and advantageous effects can be achieved according to the present embodiment.

(1) When the speed restriction ON is selected by the restriction selection switch 18, the restriction amount ΔN of the engine maximum rotational speed is set to be greater in the medium speed ratio region where the torque converter speed ratio e is e1≤e<e2 than in the low speed ratio region and the high speed ratio region where the torque converter speed ratio e is e<e1 and e≥e2, respectively. This allows fuel economy to be significantly improved without reducing so much the maximum driving force and the maximum vehicle speed, thereby preventing mobility and workability from being reduced.

(2) Since it is arranged that when the predetermined period of time to has elapsed after the engine maximum rotational speed is restricted to the predetermined value Ns12 with the torque converter speed ratio e in the medium speed ratio region, the rotational speed restriction amount ΔN is reduced so that the engine maximum rotational speed becomes the predetermined value Ns2. As a result, the operator is prevented from feeling uncomfortable due to significant reduction in the vehicle speed in uphill traveling or the like.

(3) Since it is arranged that the engine maximum rotational speed is restricted when the speed step is in the first speed or the second speed, high-speed traveling is enabled without any hindrance in normal travel where the speed step is in the third speed or the fourth speed.

Figure 14:
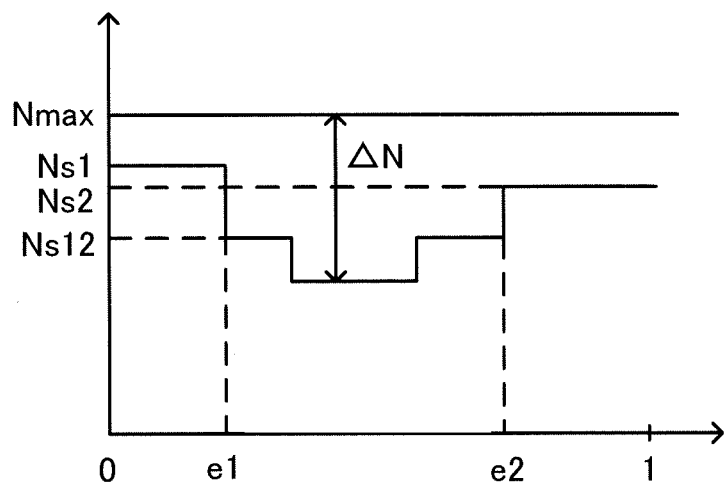
FIG. 14 is a diagram showing a variation of FIG. 5.

It is to be noted that while in the first embodiment described above, the engine maximum rotational speed is restricted to the predetermined values Ns1, Ns12, and Ns2 in all the ranges where the speed ratio e is in the low speed ratio region, the medium speed ratio region, and the high speed ratio region, respectively, it may be arranged that the engine maximum rotational speed is restricted only when the speed ratio e is in the medium speed ratio region and the high speed ratio region or only when the speed ratio e is in the medium speed ratio region. It may also be arranged that where the speed ratio e is in the medium speed ratio region, the engine maximum rotational speed is not uniformly restricted to the predetermined value Ns12, but the restriction amount ΔN of the engine maximum rotational speed is set more finely in accordance with the speed ratio e as shown in FIG. 14. While in the embodiment described above, it is arranged that when the predetermined period of time ta has elapsed after the engine maximum rotational speed is restricted to the predetermined value Ns12 where the torque converter speed ratio e is in the medium speed ratio region, the engine maximum rotational speed is set to be the predetermined value Ns2, it may also be arranged that after the predetermined period of time ta has elapsed, the rotational speed restriction amount ΔN is gradually reduced.

Second Embodiment

A motor control device for a working vehicle according to a second embodiment of the present invention will now be explained with reference to FIG. 15 to FIG. 20.

While in the first embodiment, it is arranged that the engine maximum rotational speed is restricted in accordance with the torque converter speed ratio e when the transmission 3 is in the first speed step and the second speed step, in the second embodiment, the engine maximum rotational speed is restricted in accordance with the torque converter speed ratio e also in the third speed step and the fourth speed step. It is to be noted that the following explanation will focus upon the points that are different from those in the first embodiment.

Figure 15:
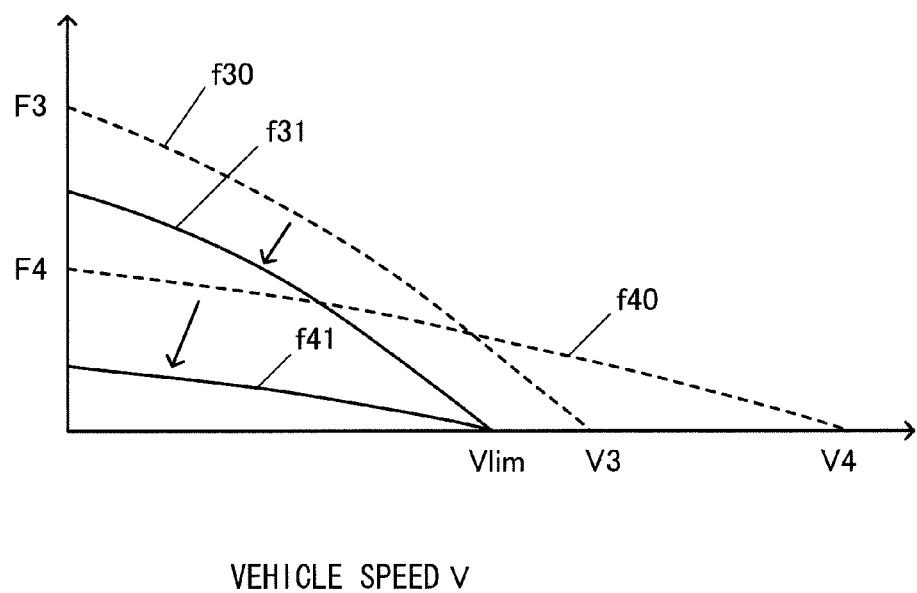
FIG. 15 is a diagram showing a relationship between a vehicle speed and a travel driving force in the third speed step and the fourth speed step as a comparison example of a second embodiment.

FIG. 15 is a traveling performance diagram of the third speed step and the fourth speed step. In the figure, f30 and f40 (dotted lines) represent characteristics at the time of speed restriction OFF (corresponding to fc and fd of FIG. 9) and f31 and f41 (solid lines) represent characteristics when the engine maximum rotational speed is uniformly restricted regardless of the torque converter speed ratio e. The maximum vehicle speeds at the time of speed restriction OFF in the third speed step and the fourth speed step are v3 and v4, respectively. On the other hand, when the engine maximum rotational speed is restricted, engine output is reduced, thereby accordingly reducing driving force that can be output at a same vehicle speed. As a result, the maximum vehicle speed in flat traveling is restricted to a predetermined value vlim.

By thus restricting the engine maximum rotational speed, the vehicle speed can be reduced to equal to or less than a set vehicle speed vlim, for example, when the maximum vehicle speed is to be restricted in a yard operation, when the maximum vehicle speed is to be restricted in a narrow work site, when the maximum vehicle speed is to be restricted due to a law or a regulation, and the like. However, if the engine maximum rotational speed is uniformly restricted regardless of the torque converter speed ratio e as in FIG. 15, when travel load (driving force) is increased in uphill traveling or the like from a state of flat traveling at the maximum vehicle speed vlim, the vehicle speed is immediately reduced from the maximum vehicle speed vlim. In addition, travel load is reduced, and thus, acceleration is poor at the time of re-acceleration. Then, in the present embodiment, the engine maximum rotational speed is restricted as follows in accordance with the torque converter speed ratio e.

Figure 16:
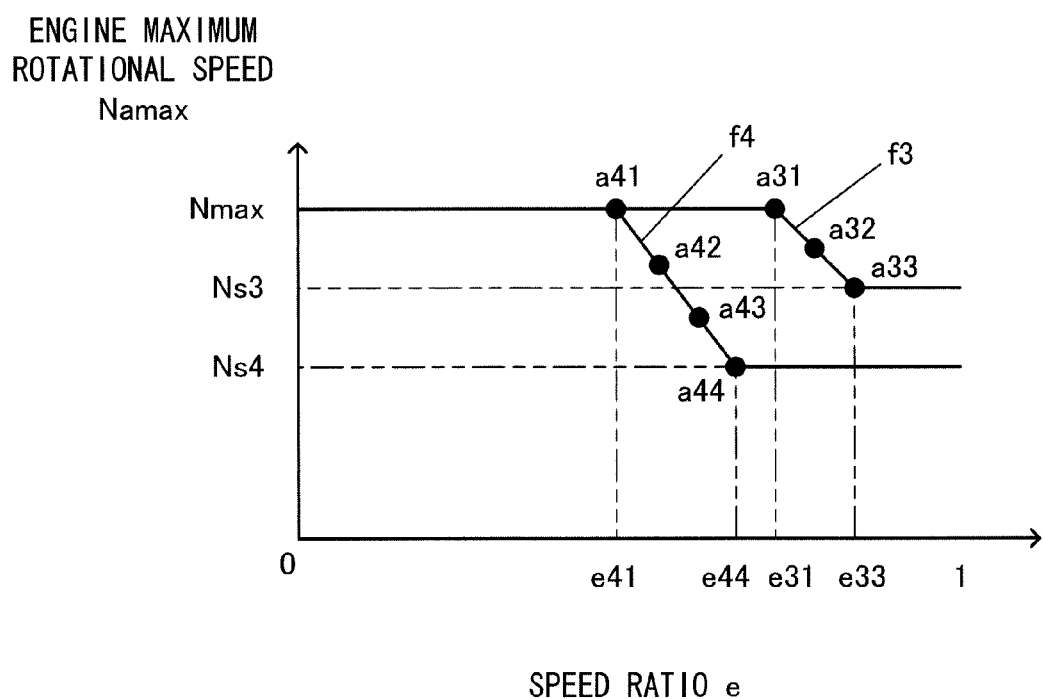
FIG. 16 is a diagram showing a relationship between a speed ratio and an engine maximum rotational speed by the motor control device according to the second embodiment.

FIG. 16 is a diagram showing a relationship between the torque converter speed ratio e and the engine maximum rotational speed Namax in the third speed step and the fourth speed step at the time of speed restriction ON. In the third speed step, the engine maximum rotational speed is not restricted if the torque converter speed ratio e is less than a predetermined value e31, and the engine maximum rotational speed is reduced if the speed ratio e becomes equal to or greater than the predetermined value e31. In this case, as indicated by a characteristic f3, the restriction amount ΔN of the engine maximum rotational speed is gradually increased in a range where the speed ratio e is equal to or greater than the predetermined value e31 and less than a predetermined value e33 and the engine maximum rotational speed is set to a predetermined value Ns3 in a range where the speed ratio e is equal to or greater than the predetermined value e33.

Also in the fourth speed step, the engine maximum rotational speed is not restricted if the torque converter speed ratio e is less than a predetermined value e41, and the engine maximum rotational speed is reduced if the speed ratio e becomes equal to or greater than the predetermined value e41. In this case, as indicated by f4, the restriction amount ΔN of the engine maximum rotational speed is gradually increased in a range where the speed ratio e is equal to or greater than the predetermined value e41 and less than a predetermined value e44 and the engine maximum rotational speed is set to a predetermined value Ns4 in a range where the speed ratio e is equal to or greater than the predetermined value e44.

Figure 17:
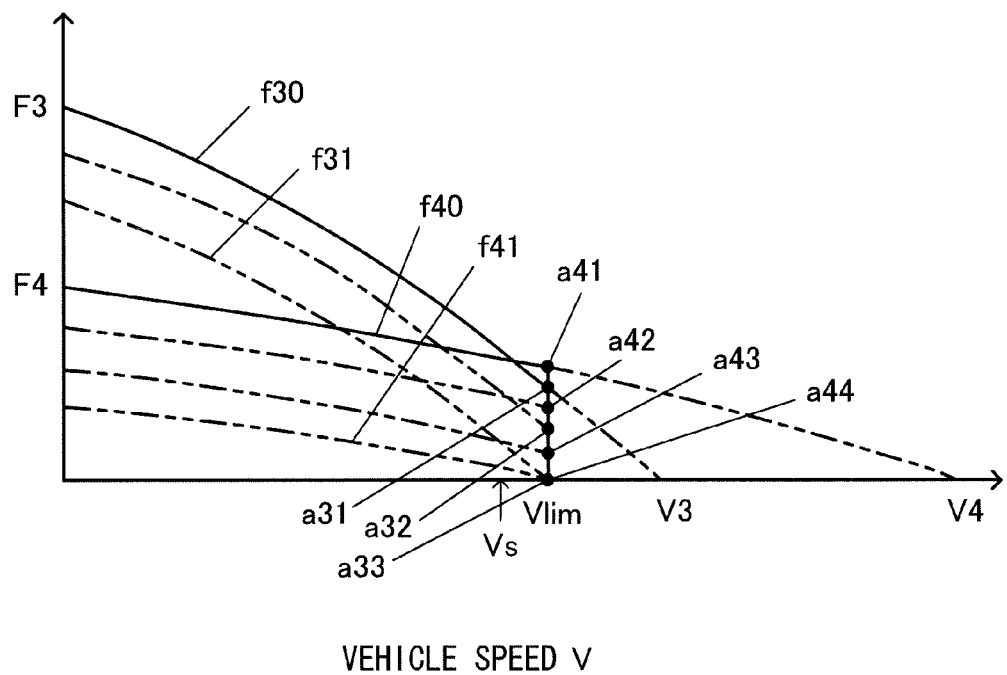
FIG. 17 is a diagram showing a relationship between a vehicle speed and a travel driving force by the motor control device according to the second embodiment.

FIG. 17 is a traveling performance diagram when the engine maximum rotational speed is restricted in accordance with the torque converter speed ratio e as in FIG. 16. In the figure, characteristics that are identical to the characteristics f30, f31, f40, and f41 of FIG. 15 are designated by the same reference numerals, and points that are corresponding to the points a31 to a33 and a41 to a44 of FIG. 16 are also designated by the same reference numerals. In FIG. 17, the driving force characteristics are the same as those at the time of speed restriction OFF before the vehicle speed reaches the vehicle speed vlim that is set in advance, and the vehicle speed is not further increased after the vehicle speed reaches the set vehicle speed vlim, thereby reducing the driving force. In other words, in the present embodiment, reduction in driving force is prevented until the vehicle speed reaches the set vehicle speed vlim, and the maximum vehicle speed is restricted to the set vehicle speed vlim. In the present embodiment, the characteristics f3 and f4 of FIG. 16 are set so as to achieve the traveling performance diagram of FIG. 17.

Figure 18:
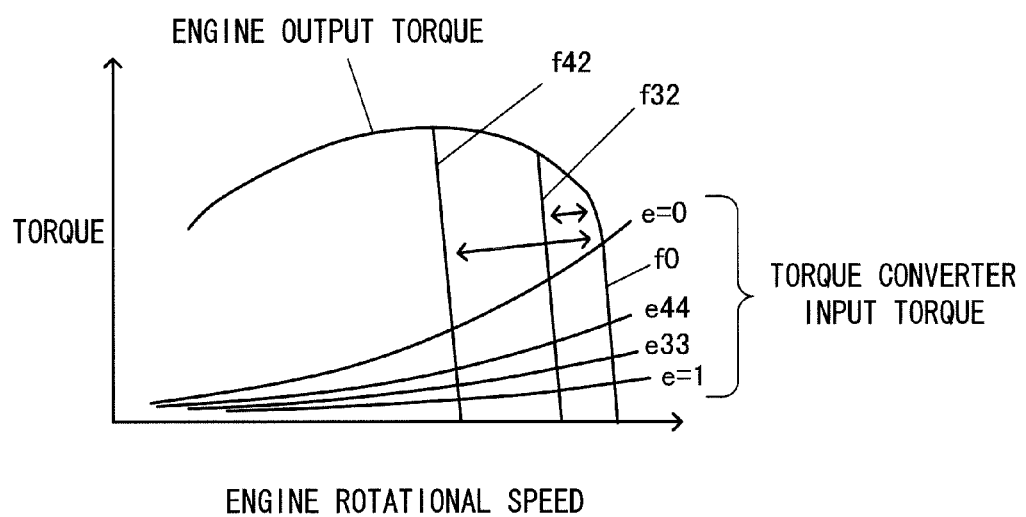
FIG. 18 is a diagram showing torque characteristics by the motor control device according to the second embodiment.

FIG. 18 is a torque diagram showing a relationship between the engine rotational speed and the torque when the accelerator pedal 12a is fully depressed. In the figure, f32 and f42 represent engine output torque characteristics when the engine maximum rotational speed is restricted to Ns3 and Ns4, respectively. If the speed ratio e is equal to or greater than the predetermined value e31 in the third speed step, the engine output torque is changed between the characteristics f0 and f32, and if the speed ratio e is equal to or greater than the predetermined value e41 in the fourth speed step, the engine output torque is changed between the characteristics f0 and f42.

Figure 19:
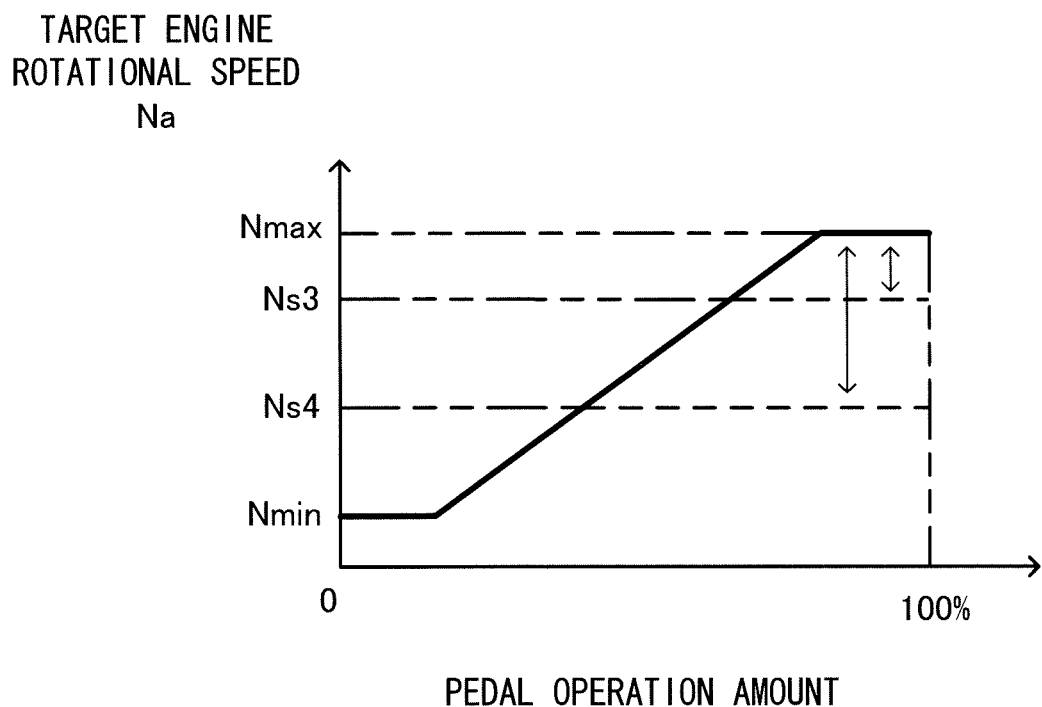
FIG. 19 is a diagram showing a relationship between a pedal operation amount and a target engine rotational speed by the motor control device according to the second embodiment.

FIG. 19 is a diagram showing a relationship between the pedal operation amount and the target engine rotational speed Na. In a state where the accelerator pedal 12a is fully depressed in the third speed step, the target engine rotational speed Na is changed between Nmax and Ns3 in accordance with the speed ratio e. In a state where the accelerator pedal 12a is fully depressed in the fourth speed step, the target engine rotational speed Na is changed between Nmax and Ns4 in accordance with the speed ratio e.

Figure 20:
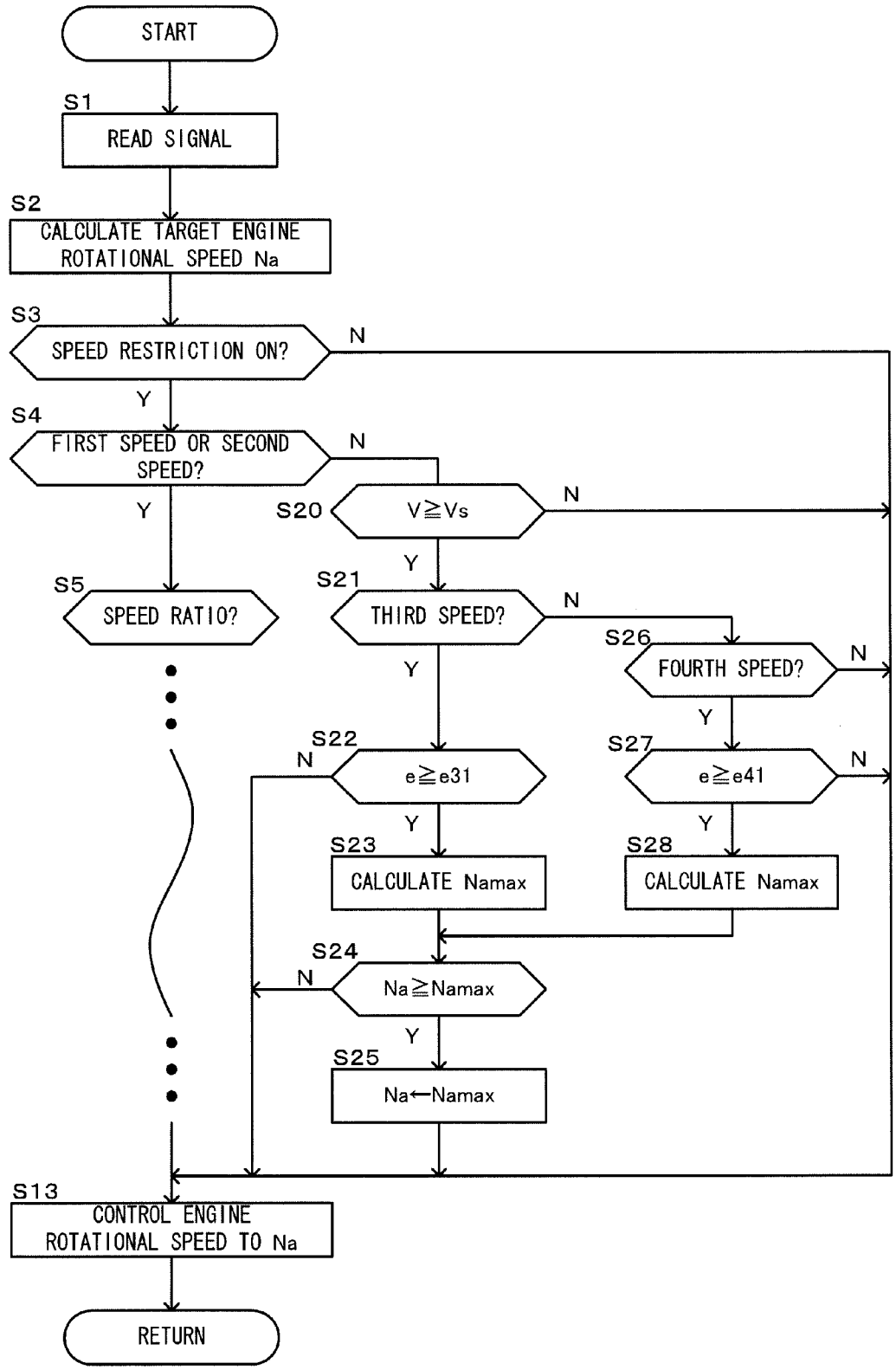
FIG. 20 is a flowchart showing an example of processing in a controller for motor control according to the second embodiment.

FIG. 20 is a flowchart showing an example of processing to be executed by the CPU of the controller 10, in particular, an example of processing related to engine rotational speed control. The processing shown in this flowchart is initiated by, for instance, turning the engine key switch on. It is to be noted that steps that are identical to those in FIG. 8 are designated by the same reference numerals, and the following explanation will focus upon the points that are different from those in FIG. 8.

If a decision is made in the step S4 that the speed step is in equal to or less than the second speed, the flow of control proceeds to the step S5 and after that, the same processing as in FIG. 8 is executed. If a decision is made in the step S4 that the speed step is in neither equal to nor less than the second speed, the flow of control proceeds to a step S20, where a decision is made as to whether or not the vehicle speed v detected by the vehicle speed detector 16 is equal to or greater than a predetermined set vehicle speed vs. The set vehicle speed vs is set as a threshold value as to whether or not restriction of the engine maximum rotational speed is to be performed and is set to a value lower than the maximum vehicle speed vlim by approximately a few km/h (e.g., 1 to 2 km/h). If a positive decision is made in the step S20, the flow of control proceeds to a step S21, and if a negative decision is made therein, the flow of control proceeds to the step S13.

In the step S21, a decision is made as to whether or not the speed step is in the third speed. If a positive decision is made in the step S21, the flow of control proceeds to a step S22, where a decision is made as to whether or not the torque converter speed ratio e is equal to or greater than the predetermined value e31 of FIG. 16. If a positive decision is made in the step S22, the flow of control proceeds to a step S23, and if a negative decision is made in the step S22, the flow of control proceeds to the step S13. In the step S23, the engine maximum rotational speed Namax is calculated in accordance with the speed ratio e based upon the characteristic f3 of FIG. 16.

On the other hand, if a negative decision is made in the step S21, the flow of control proceeds to a step S26, where a decision is made as to whether or not the speed step is in the fourth speed. If a positive decision is made in the step S26, the flow of control proceeds to a step S27, where a decision is made as to whether or not the torque converter speed ratio e is equal to or greater than the predetermined value e41 of FIG. 16. If a positive decision is made in the step S27, the flow of control proceeds to a step S28, and if a negative decision is made in the step S27, the flow of control proceeds to the step S13. In the step S28, the engine maximum rotational speed Namax is calculated in accordance with the speed ratio e based upon the characteristic f4 of FIG. 16.

In a step S24, a decision is made as to whether or not the target engine rotational speed Na calculated in the step S2, i.e., the target engine rotational speed Na calculated based upon the characteristic of no-restriction of the engine maximum rotational speed, is equal to or greater than the engine maximum rotational speed Namax calculated in the step S23 or in the step S28. If a positive decision is made in the step S24, the flow of control proceeds to a step S25, and if a negative decision is made in the step S24, the flow of control proceeds to the step S13. In the step S25, the engine maximum rotational speed Namax is set as the target engine rotational speed Na and then the flow of control proceeds to the step S13.

The operations of the second embodiment are summarized as follows. During traveling in the third speed step or the fourth speed step in a state where the speed restriction ON is selected by the restriction selection switch 18, if the vehicle speed v becomes equal to or greater than the predetermined value vs, the engine maximum rotational speed is restricted in accordance with the speed ratio e (the step S25). In particular, in the third speed step, when the speed ratio e is equal to or greater than the predetermined value e31, the engine maximum rotational speed when the pedal is fully depressed becomes less than the upper limit value Nmax, and when the speed ratio e becomes equal to or greater than the predetermined value e33, the engine maximum rotational speed becomes the predetermined value Ns3. In addition, in the fourth speed step, when the speed ratio e is equal to or greater than the predetermined value e41, the engine maximum rotational speed when the pedal is fully depressed becomes lower than the upper limit value Nmax, and when the speed ratio e becomes equal to or greater than the predetermined value e44, the engine maximum rotational speed becomes the predetermined value Ns4.

This allows a driving force which is equivalent to that in the speed restriction OFF to be obtained in a range where the speed ratio e is less than the predetermined value e31 or e41, thereby preventing reduction in the traveling performance. In addition, the maximum vehicle speed can be limited to the set vehicle speed vlim in a range where the speed ratio e is equal to or greater than the predetermined value e31 or e41, thereby enabling travel in a situation with vehicle speed restriction. Due to this, even if travel load is increased by transitioning from flat traveling at the set vehicle speed vlim to uphill traveling, the vehicle speed will not be immediately reduced, thereby enabling travel at the set vehicle speed vlim. In addition, for re-acceleration in transition from steep-uphill traveling to flat traveling, i.e., when travel load is reduced, full engine output is available, thereby acquiring good acceleration.

On the other hand, if the vehicle speed v is less than the predetermined value vs during traveling in the third speed step or the fourth speed step, the engine maximum rotational speed is not restricted regardless of the speed ratio e (the step S20 to the step S13). Due to this, good deceleration performance can be exerted when a deceleration operation for changing from forward to reverse or reverse to forward is made during traveling.

The following operations and advantageous effects can be achieved according to the second embodiment.

(1) Since it is arranged that if the torque converter speed ratio e becomes equal to or greater than the predetermined value e31 or e41 in the third speed step or the fourth speed step, the engine maximum rotational speed is restricted, reduction in travel driving force can be inhibited or limited compared to when the engine maximum rotational speed is uniformly restricted regardless of the torque converter speed ratio e, and travel is possible at the set vehicle speed vlim even if transitioning from flat traveling at the set vehicle speed vlim to uphill traveling.

(2) Since it is arranged that the restriction amount ΔN of the engine maximum rotational speed is gradually increased with an increase in the torque converter speed ratio e, reduction in driving force is prevented until the vehicle speed reaches the maximum vehicle speed and the maximum vehicle speed can be restricted to the set vehicle speed vlim.

(3) Since it is arranged that engine maximum rotational speed restriction is not performed where the vehicle speed v is equal to or less than the predetermined value vs, reduction in deceleration performance during traveling can be prevented.

It is to be noted that in the second embodiment described above, while it is arranged that the engine maximum rotational speed is restricted in accordance with the speed ratio e, the speed ratio e may not be correctly calculated and the vehicle speed may exceed the maximum vehicle speed vlim if problem in the rotational speed detectors 14 and 15 results in an abnormal detection value. In order to prevent this, a decision is made by the controller 10 as a determination means as to whether detection values of the rotational speed detectors 14 and 15 are normal or abnormal, and, if a decision is made that the detection values are abnormal, the engine maximum rotational speed may be restricted to the predetermined values Ns3 or Ns4 in accordance with a speed step regardless of the speed ratio e.

In the first embodiment described above (FIG. 5), it is arranged that a control signal is output from the controller 10 to the engine control unit 1a so that the restriction amount ΔN of the engine maximum rotational speed is greater when the speed ratio e is in an acceleration region of equal to or greater than the predetermined value e1 (the first predetermined value) in the first speed step or the second speed step than when the speed ratio e is less than the predetermined value e1. In addition, in the second embodiment described above (FIG. 16), it is arranged that the engine maximum rotational speed is restricted when the speed ratio e is in an acceleration region of equal to or greater than the predetermined value e31 or e41 in the third speed step or the fourth speed step and the engine maximum rotational speed is not restricted when the speed ratio e is less than the predetermined value e31 or e41. However, the structure of the speed restriction means is not limited to that described above as long as the engine maximum rotational speed is restricted to a value lower than that of a non-acceleration region when the speed ratio e is in an acceleration region. For example, it may be arranged that the engine maximum rotational speed is restricted only in the third speed step or the fourth speed step and the engine maximum rotational speed is not restricted in the first speed step or the second speed step. It may be arranged that the engine maximum rotational speed is restricted regardless of the speed step.

While in the first embodiment described above, it is arranged that the engine maximum rotational speed is restricted to Ns1 if e<e1, the engine maximum rotational speed is restricted to Ns12 if e1≤e<e2, and the engine maximum rotational speed is restricted to Ns2 if e≥e2, restriction characteristics of the engine maximum rotational speed are not limited to those described above as long as the restriction amount ΔN of the engine maximum rotational speed is made greater when the speed ratio e is equal to or greater than the predetermined value e1 and less than the predetermined value e2 (the second predetermined value) than when the speed ratio e is less than the predetermined value e1 and equal to or greater than the predetermined value e2. While in the second embodiment described above, it is arranged that the restriction amount ΔN of the engine maximum rotational speed is gradually increased with an increase in the speed ratio e when the vehicle speed is equal to or greater than the predetermined value vs that is lower than the set vehicle speed vlim (speed limit, or restriction vehicle speed), the engine maximum rotational speed may be restricted regardless of the vehicle speed. While it is arranged that the engine maximum rotational speed is restricted when the restriction selection switch 18 is on, it may be arranged that the engine maximum rotational speed is restricted regardless of the presence or absence of the restriction selection switch 18.

Any structure may be adopted in the controller 10 and the engine control unit 1a as rotational speed control means as long as the engine rotational speed is controlled in accordance with an operation amount of the accelerator pedal 12a. The structure of the travel drive device that transmits rotation of the engine 1 to the wheels 6 through the torque converter 2 and the transmission 3 is not limited to that shown in FIG. 2. While it is arranged that the torque converter speed ratio e is detected by the rotational speed detectors 14 and 15, any structure may be adopted in the speed ratio detection means.

While in the above, an example in which the present invention is applied to a wheel loader is explained, the present invention can be similarly applied to another working vehicle to be driven by a torque converter. In other words, the present invention is not limited to the motor control device for a working vehicle of the embodiment as long as features and functions of the present invention can be achieved.

Although a variety of embodiments and variations are described above, the present invention is not to be limited only to those contents. The scope of the present invention includes other possible embodiments invented within the scope of the technical idea of the present invention.

The disclosure of the following priority application is herein incorporated by reference: Japanese Patent Application No. 2009-146197 filed on 19 Jun. 2009.

The invention claimed is:

1. A motor control device for a working vehicle, comprising:
    a rotational speed control device that controls a rotational speed of a motor in accordance with an operation amount of an accelerator pedal;
    a travel drive device that transmits rotation of the motor to wheels through a torque converter and a transmission;
    a speed ratio detection device that detects a speed ratio of an input shaft and an output shaft of the torque converter; and
    a speed restriction device that restricts the maximum rotations speed of the motor in accordance with a speed ratio detected by the speed ratio detection device; wherein:
    the speed restriction device reduces the maximum rotational speed by a restriction amount, wherein a value of an acceleration region restriction amount, which is set when a detected speed ratio is equal to or less than 1 and in the acceleration region of the rotational speed of the motor in which the detected speed ratio is equal to or greater than a first predetermined value and less than a second predetermined value which is greater than the first predetermined value, is greater than a value of a non-acceleration region restriction amount which is set when a detected speed ratio is equal to or less than 1 and in the non-acceleration region in which the detected speed ratio is less than the first predetermined value or equal to or greater than the second predetermined value.

2. A motor control device for a working vehicle according to claim 1, wherein: the speed restriction device reduces a value of the maximum rotational speed only when a detected speed ratio is equal to or greater than the first predetermined value and less that the second predetermined value, or when the detected speed ratio is either within a range of equal to or greater than the first predetermined value and less than the second predetermined value or within a range of equal to or greater than the second predetermined value.

3. A motor control device for a working vehicle according to claim 1, wherein:
    in a case where a speed step of the transmission is a low speed step of a first speed step or a second speed step, the speed restriction device reduces the maximum rotational speed of the motor.

4. A motor control device for a working vehicle according to claim 1, wherein:
    the speed restriction device, after increasing the restriction amount, reduces the restriction amount as time passes.

5. A motor control device for a working vehicle according to claim 1, wherein:
    in a case where a speed step of the transmission is a high speed step of equal to or greater than a third speed step, when a detected speed ratio is equal to or greater than a third predetermined value, the speed restriction device gradually increases the restriction amount of the maximum rotational speed of the motor with an increase in a speed ratio so that a maximum vehicle speed of a vehicle becomes a vehicle speed limit that is set in advance.

6. A motor control device for a working vehicle according to claim 5, further comprising:
    a vehicle speed detection device that detects a vehicle speed, wherein:
    in the case where the speed step of the transmission is the high step of equal to or greater than the third speed step, when a vehicle speed detected by the vehicle speed detection device is equal to or greater than a set vehicle speed that is lower than the vehicle speed limit, the speed restriction device gradually increases the restriction amount, and, when a vehicle speed is less than the set vehicle speed, the speed restriction device does not restrict the maximum rotational speed.

7. A motor control device for a working vehicle according to claim 5, further comprising:
a determination device that makes a decision as to whether a value detected by the speed ratio detection device is normal or abnormal, wherein:
in the case where the speed step of the transmission is the high speed step of equal to or greater than the third speed step, when the determination device makes a decision that the detection value is normal, the speed restriction device gradually reduces the maximum rotational speed to a predetermined value with an increase in a speed ratio, and, when the determination device makes a decision that the detection value is abnormal, the speed restriction device restricts the maximum rotational speed to the predetermined value regardless of a speed ratio.

* * * * *